US009009183B2

(12) United States Patent
Ahmed et al.

(10) Patent No.: US 9,009,183 B2
(45) Date of Patent: Apr. 14, 2015

(54) TRANSFORMATION OF A SYSTEM CHANGE SET FROM MACHINE-CONSUMABLE FORM TO A FORM THAT IS READILY CONSUMABLE BY A HUMAN

(75) Inventors: Haroon Ahmed, Bellevue, WA (US); James D. Laflen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/288,046

(22) Filed: Nov. 3, 2011

(65) Prior Publication Data

US 2013/0117011 A1 May 9, 2013

(51) Int. Cl.
G06F 17/30 (2006.01)
H04L 12/24 (2006.01)
H04Q 9/00 (2006.01)

(52) U.S. Cl.
CPC ............. *H04L 41/08* (2013.01); *H04L 41/22* (2013.01); *H04Q 9/00* (2013.01); *H04Q 2209/84* (2013.01)

(58) Field of Classification Search
CPC .................................. G06F 17/30; G06F 17/00
See application file for complete search history.

(56) References Cited

U.S. PATENT DOCUMENTS

| 4,591,983 | A | * | 5/1986 | Bennett et al. | 706/53 |
|---|---|---|---|---|---|
| 5,226,160 | A | * | 7/1993 | Waldron et al. | 719/324 |
| 5,418,888 | A | * | 5/1995 | Alden | 706/48 |
| 5,778,157 | A | * | 7/1998 | Oatman et al. | 706/46 |
| 5,913,185 | A | * | 6/1999 | Martino et al. | 704/8 |
| 6,259,969 | B1 | * | 7/2001 | Tackett et al. | 700/264 |
| 6,434,520 | B1 | * | 8/2002 | Kanevsky et al. | 704/243 |
| 6,532,401 | B2 | * | 3/2003 | Tackett et al. | 700/245 |
| 6,799,299 | B1 | * | 9/2004 | Li et al. | 715/235 |
| 6,856,322 | B1 | * | 2/2005 | Broadwell et al. | 345/629 |
| 6,938,041 | B1 | * | 8/2005 | Brandow et al. | 1/1 |
| 7,136,825 | B2 | * | 11/2006 | Araki et al. | 705/7.16 |
| 7,490,073 | B1 | * | 2/2009 | Qureshi et al. | 706/50 |
| 7,554,576 | B2 | * | 6/2009 | Erol et al. | 348/211.3 |
| 7,627,476 | B2 | * | 12/2009 | Nanavati et al. | 704/270.1 |
| 7,734,999 | B2 | * | 6/2010 | Leung et al. | 715/222 |
| 7,761,858 | B1 | * | 7/2010 | Chang et al. | 717/140 |
| 7,782,186 | B2 | * | 8/2010 | Tsutazawa et al. | 340/506 |
| 7,788,295 | B2 | | 8/2010 | Wall et al. | |
| 7,908,601 | B2 | | 3/2011 | Clemm et al. | |
| 7,949,991 | B1 | * | 5/2011 | Kuwamoto et al. | 717/100 |
| 7,996,814 | B1 | * | 8/2011 | Qureshi et al. | 717/120 |
| 8,032,860 | B2 | * | 10/2011 | Piehler et al. | 717/110 |
| 8,095,408 | B2 | * | 1/2012 | Schigel et al. | 705/7.13 |
| 8,170,975 | B1 | * | 5/2012 | Qureshi et al. | 706/47 |
| 8,239,340 | B2 | * | 8/2012 | Hanson | 706/47 |
| 8,239,820 | B1 | * | 8/2012 | White et al. | 717/101 |

(Continued)

OTHER PUBLICATIONS

Zhang, Qin, "Improving Software Development Management with Software Project Telemetry," Oct. 2005, University of Hawaii Department of Information and Computer Science, pp. 1-136 (136 total pages).*

(Continued)

*Primary Examiner* — Farhan Syed
(74) *Attorney, Agent, or Firm* — Brian Haslam; Mike Allen; Micky Minhas (57) ABSTRACT

A telemetry system can parse and transform one or more change sets from a format intended to be processed by a computer to a form that is readily consumable by a human. The report or display generated to present the results can be customized for a particular domain.

19 Claims, 7 Drawing Sheets

(56) References Cited

U.S. PATENT DOCUMENTS

| | | | | |
|---|---|---|---|---|
| 8,326,873 | B2* | 12/2012 | Ellis et al. | 707/783 |
| 8,635,204 | B1* | 1/2014 | Xie et al. | 707/709 |
| 8,745,065 | B2* | 6/2014 | Wang | 707/748 |
| 8,903,815 | B2* | 12/2014 | Ellis et al. | 707/726 |
| 2002/0086269 | A1* | 7/2002 | Shpiro | 434/156 |
| 2005/0108001 | A1* | 5/2005 | Aarskog | 704/10 |
| 2005/0193361 | A1* | 9/2005 | Vitanov et al. | 716/19 |
| 2006/0150107 | A1* | 7/2006 | Leung et al. | 715/745 |
| 2007/0061427 | A1* | 3/2007 | Vishnia-Shabtai et al. | 709/220 |
| 2007/0087756 | A1* | 4/2007 | Hoffberg | 455/450 |
| 2007/0239700 | A1 | 10/2007 | Ramachandran | |
| 2009/0177685 | A1* | 7/2009 | Ellis et al. | 707/103 R |
| 2009/0222789 | A1* | 9/2009 | Frank et al. | 717/104 |
| 2009/0259612 | A1* | 10/2009 | Hanson | 706/47 |
| 2009/0293046 | A1* | 11/2009 | Cheriton | 717/136 |
| 2010/0058285 | A1* | 3/2010 | Meijer et al. | 717/104 |
| 2010/0088283 | A1 | 4/2010 | Ahmed | |
| 2010/0088350 | A1 | 4/2010 | Ahmed | |
| 2010/0161674 | A1* | 6/2010 | Winkler et al. | 707/802 |
| 2010/0269096 | A1* | 10/2010 | Araya et al. | 717/113 |
| 2010/0317420 | A1* | 12/2010 | Hoffberg | 463/1 |
| 2010/0332235 | A1* | 12/2010 | David | 704/275 |
| 2011/0161931 | A1 | 6/2011 | Camelon et al. | |
| 2012/0058775 | A1* | 3/2012 | Dupray et al. | 455/456.1 |
| 2012/0278339 | A1* | 11/2012 | Wang | 707/748 |
| 2013/0060814 | A1* | 3/2013 | Hui et al. | 707/802 |
| 2013/0285855 | A1* | 10/2013 | Dupray et al. | 342/451 |
| 2013/0311510 | A1* | 11/2013 | Ellis et al. | 707/769 |
| 2014/0330616 | A1* | 11/2014 | Lyras | 705/7.28 |

OTHER PUBLICATIONS

Fisher, Terry, et al., "Access Control List Database Design and Schema Specifications for the ECS Project," Jan. 1998, Raytheon Systems Company, pp. 1-47 (47 total pages).*

"Configuration Management Tools Summary", Retrieved at http://www.daveeaton.com/scm/CMTools.html>, Version 9.0c, Feb. 22, 2007, pp. 32.

"Microsoft® SQL Server® code name 'Denali' Community Technology Preview 3 (CTP 3) Feature Pack", Retrieved at <<http://www.microsoft.com/download/en/details.aspx?id=26726>>, Jul. 8, 2011, pp. 7.

Feiler, Peter H., "Configuration Management Models in Commercial Environments", Retrieved at <<http://webcache.googleusercontent.com/search?q=cachettp://ftp.sei.cmu.edu/pub/case-env/config_mgt/tech_rep/cm_models_TR07_91.pdf>>, Technical Report, CMU/SEI-91-TR-7, ESD-91-TR-7, Mar. 1991, pp. 63.

"Why is VTS different?", Retrieved at http://www.trihedral.com/products/vts-hmi-software/newfeatures/why-vts/>>, Retrieved Date: Nov. 1, 2011, pp. 3.

* cited by examiner

```
┌─────────────────────────────────────────────────────────────────────┐
│ PREVIEW DATABASE UPDATES                                         X  │
│ ┌─────────────────────────────────────────────────────────────┐    │
│ │ HIGHLIGHTS                                              152 │    │
│ │    POSSIBLE DATA ISSUES                                     │    │
│ │       THE TYPE FOR COLUMN C IN TABLE 1 OF DATABASE X IS     │    │
│ │       CURRENTLY NVARCHAR (40) NOT NULL BUT IS BEING         │    │
│ │       CHANGED TO NVARCHAR (15) NOT NULL. DATA LOSS COULD    │    │
│ │       OCCUR.                                                │    │
│ └─────────────────────────────────────────────────────────────┘    │
│ ┌─────────────────────────────────────────────────────────────┐    │
│ │ WARNINGS                                                154 │    │
│ │    THE TYPE FOR COLUMN C IN TABLE 1 OF DATABASE X IS        │    │
│ │    CURRENTLY NVARCHAR (40) NOT NULL BUT IS BEING CHANGED    │    │
│ │    TO NVARCHAR (15) NOT NULL. DATA LOSS COULD OCCUR.        │    │
│ └─────────────────────────────────────────────────────────────┘    │
│ ┌─────────────────────────────────────────────────────────────┐    │
│ │ USER ACTIONS                                            156 │    │
│ │    ALTER                                                    │    │
│ │       TABLE 1 OF DATABASE X                                 │    │
│ └─────────────────────────────────────────────────────────────┘    │
│ ┌─────────────────────────────────────────────────────────────┐    │
│ │ SUPPORTING ACTIONS                                      158 │    │
│ │    DROP                                                     │    │
│ │       INDEX 1 OF TABLE 1 OF DATABASE X                      │    │
│ │    CREATE                                                   │    │
│ │       INDEX 1 OF TABLE 1 OF DATABASE X                      │    │
│ └─────────────────────────────────────────────────────────────┘    │
└─────────────────────────────────────────────────────────────────────┘
```

FIG. 4

TRANSFORMATION OF A SYSTEM CHANGE SET FROM MACHINE-CONSUMABLE FORM TO A FORM THAT IS READILY CONSUMABLE BY A HUMAN

BACKGROUND

Understanding the scope and nature of a set of changes and the cascading impact of the changes on a system is difficult because most systems have a network of tightly-coupled internal subsystems. A change or set of changes made to one or more of the subsystems usually involves changing other related subsystems. Furthermore, changes are often in a format that is convenient for machines to process but that is not easily understandable by humans.

SUMMARY

One or more sets of system changes can be parsed, analyzed and transformed from a machine friendly form into a natural language presentation such as a report or display that can be understood by a human. The report or display can be persisted. It can be customized for a particular environment, user interface culture or user profile (e.g., database administrator, developer, executive, etc.). It can be custom formatted. It can calculate performance indicators for the system. The report or display can provide information concerning the nature and scope of the changes. It can provide a targeted impact analysis of application of the changes on a system. It can identify domain-specific performance indicators. A domain can be a database domain, a virtual runtime environment domain, a native runtime environment domain, a program development domain or any other application or business area.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

One or more sets of changes to a system of interconnected subsystems can be parsed, analyzed and transformed from a machine-consumable form into a human-consumable presentation such as a natural language report or display. The changes can be in any form including but not limited to declarative definitions and imperative commands.

A declarative change defines the change itself, that is, the declarative change defines the desired state. For example, in a database domain, a declarative change can be "Create a table, Table 1, having Columns A and B". The present or current state of the system does not need to be known. In a declarative environment, the imperative commands that have to be applied to the system to reach the state specified by the declarative change can be programmatically computed.

In contrast, an imperative change in the database domain can be "Alter Table 1, Add Column C". The state of the system has to be known so that the commands needed to get the system to a desired state can be correctly developed. For example, attempting to add a Column C to a table that already has a Column C will likely result in an error. Hence, typically imperative changes are specific to a particular target environment whereas declarative changes are not. In a declarative environment, the system can compare the declarative definitions of the source state (e.g., state A) and the target state (e.g., state B) to determine an imperative plan to move the system from state A to state B.

The report or display can be customized to include domain-specific performance indicators. The report or display can be customized for any user interface environment. The report or display can be customized for any user profile. Statements in the report or display can be related back to one or more changes in the set or sets of changes. Repercussions or results of any particular change on one or more subsystems within the system can be provided in absolute terms. Repercussions or results of any particular change on one or more subsystems within the system can be provided relative to a particular target system, subsystem or environment. The usage pattern (a repeatable set of acts) of running change sets in imperative commands over a clone of a target system can be provided. The resulting state of the cloned system can be compared to the original system. Reverse engineering can be used to determine the declarative equivalent of a set of changes. The changes themselves and the effect of the changes can be described in a natural language report or display. This paradigm can be used to generalize changes meant for one target environment to other target environments.

A snapshot of a running system can be taken before applying the one or more sets of changes. The changes can take the form of imperative commands to the system. After the changes are applied to the system, the state of the system can be compared to the snapshot. Reverse engineering can be used to determine the declarative equivalent of the changes. The changes can be described in a report or display. This paradigm can be used to furnish a post mortem report. The change reports can be logged along with corresponding change sets in source control and version tracking systems. Two versions of the target system (the proxy before update and the proxy after update) can be used to determine the delta by reverse engineering. An analysis report or display can be provided. This paradigm can be used to create email notification systems per change set or for a specified period of time.

Telemetry of System Changes

Figure 1A:
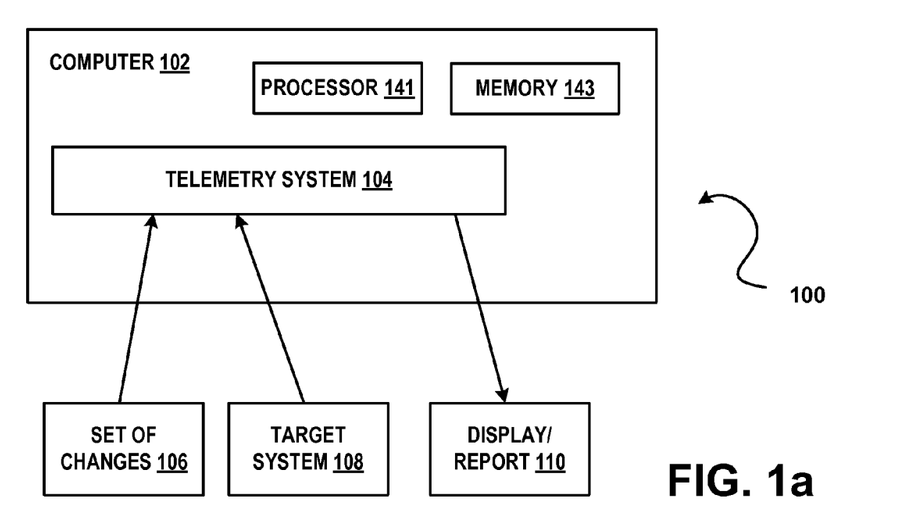
FIG. 1a illustrates an example of a system 100 that provides human-consumable information associated with the impact of application of one or more sets of changes on a system in accordance with aspects of the subject matter disclosed herein.

FIG. 1a illustrates an example of a system 100 that analyses one or more sets of changes in accordance with aspects of the subject matter disclosed herein. All or portions of system 100 may reside on one or more computers such as the computers described below with respect to FIG. 3. System 100 may execute on a software development computer such as the software development computer described with respect to FIG. 4. System 100 or portions thereof may execute within an integrated development environment (IDE) or may execute outside of an IDE. The IDE can be an IDE such as the one described with respect to FIG. 4 or can be any other IDE. All or portions of system 100 may be implemented as a plug-in or add-on.

System 100 may include one or more computers or computing devices such as a computer 102 comprising: one or more processors such as processor 141, etc., a memory such as memory 143, and a telemetry system such as telemetry system 104. The telemetry system may receive one or more sets of changes such as set of changes 106, etc. and a target system such as target system 108 and generate a display or report such as display/report 110. Set of changes 106 can be a source model. (For example, for a source model of a database that includes two tables, the set of changes can be the definitions of the two tables, e.g., Table 1 having Columns A, B and C and Table 2 having Column D.) When a change set comprises declarative definitions, the state of the target system 108 does not need to be known. The set of imperative commands needed to place the target system into the desired state (the state in which two tables exist, Table 1 having Columns A, B and C and Table 2 having Column D) can be computed. The system can be a running system or a representation of a system such as but not limited to a snapshot or a source code project, scripts, output artifact, diagram or any description of intent.

Figure 1B:
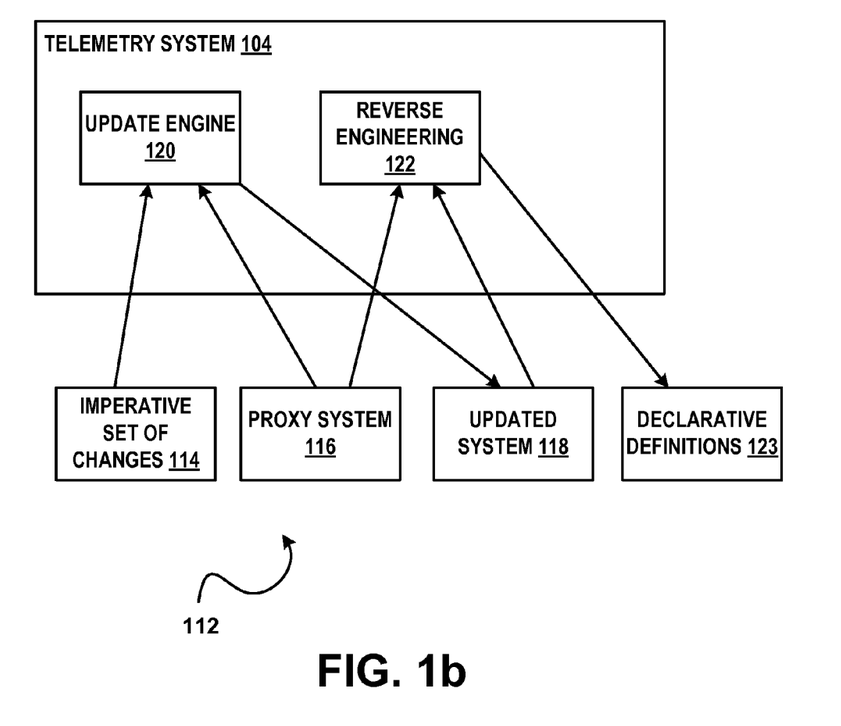
FIG. 1b illustrates an example of a system 112 that converts a set of changes comprising imperative commands into declarative definitions in accordance with aspects of the subject matter disclosed herein.

Imperative commands can be converted to declarative definitions as illustrated in FIG. 1b. System 112 can comprise a portion of system 100. System 112 can include an update engine 120 that receives one or more imperative commands as a change set 114 comprising imperative commands and can apply the one or more imperative commands to a target environment runtime proxy such as proxy system 116 to generate an updated system 118. System 112 can include a reverse engineering program module or component such as reverse engineering module 122. Change set 114 is specific for a particular target. That is, the state of the target system has to be known in order to generate a correct set of imperative commands. For example, consider an imperative command, "Add Column C to Table 1". To successfully add Column C to Table 1, the system has to know that Column C does not already exist in Table 1.

Figure 1C:
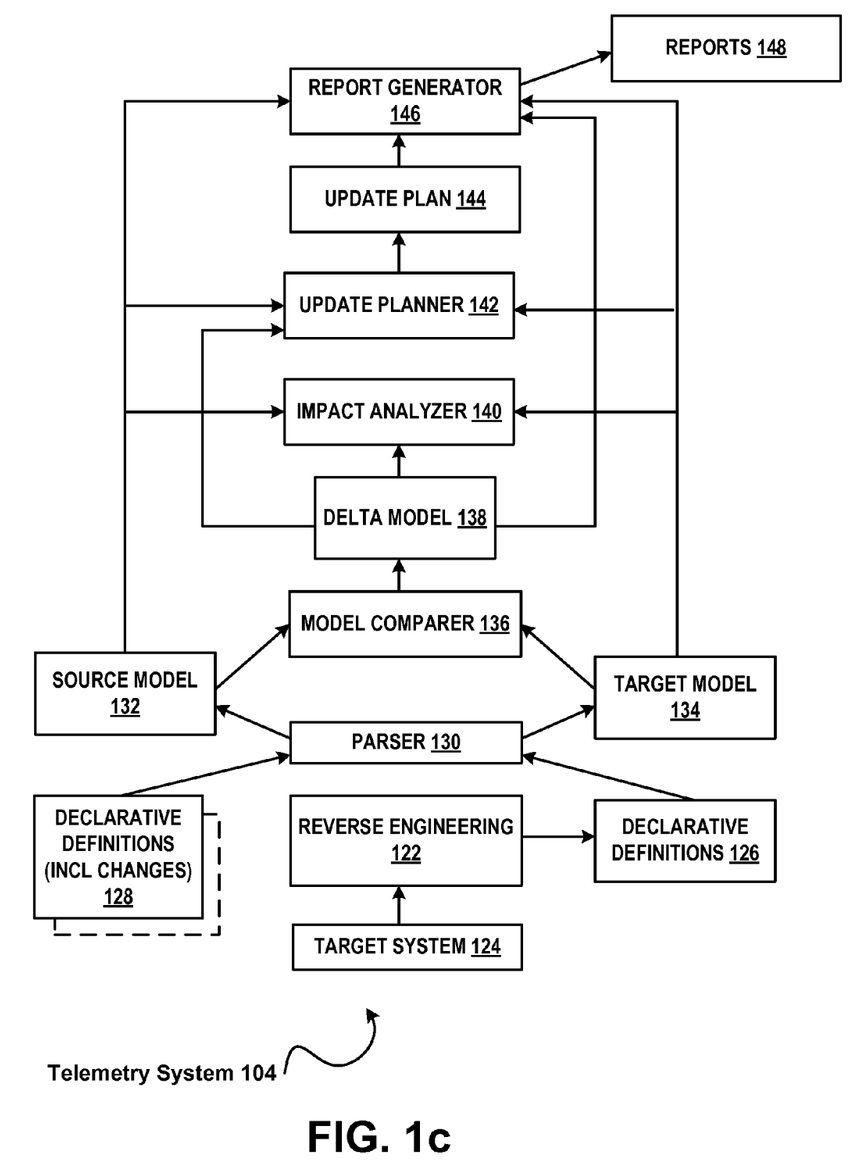
FIG. 1c illustrates a more detailed example of the system of FIG. 1a in accordance with aspects of the subject matter disclosed herein.

The imperative commands of the imperative change set can be converted to declarative definitions by applying the following usage pattern. A reverse engineering snapshot of the running system can be taken. The snapshot can be used as the source model (e.g., proxy system 116). The imperative changes (e.g., imperative set of changes 114) can be applied to the proxy system to create the mutated target model, updated system 118. The reverse engineering module 122 can compare the source model and the target model to compute a set of declarative definitions. That is, the reverse engineering module 122 can receive the source model (e.g., proxy system 116) and the updated system 118 and reverse engineer the state of the updated system 118 to produce the set of changes in the form of declarative definitions such as declarative definitions 123. FIG. 1c is an example of a telemetry system such as telemetry system 104 described in FIG. 1a and FIG. 1b. Telemetry system 104 can include any combination of: one or more program modules or components such as reverse engineering module 122, parser 130, model comparer 136, impact analyzer 140, update planner 142 and/or display or report generator 146. Telemetry system 104 may also include other components (not shown) known in the arts.

Referring now to FIG. 1c, after the one or more sets of changes have been applied to the target environment (e.g. target system 124), the reverse engineering module 122 can reverse engineer the state of the target system 124 to produce a set of declarative definitions that represent the state of the target system 124. A parser such as parser 130 can parse the declarative definitions of the set of declarative definitions 128 of the set of changes to a domain specific declarative source model. The parser 130 can parse the declarative definitions 126 representing the state of the target system 124 to a domain specific declarative target model 134. The domain specific declarative models capture the high order entities and relationships of the domain in a way that enables the relationships to be analyzed. The declarative models can capture details of the high order entities or objects and can map the relationships to originating fragments in the declarative definitions.

The source model 132 and the target model 134 can be compared by a model comparer 136. The model comparer 136 can create a delta model such as delta model 138. Delta model 138 can represent the differences between source model 132 and target model 134. To continue with the example used herein, the delta model in the example provided would contain a definition for Table 1, Column C. The delta model 138 can be used to comprehend the changes intended to be made from source change set to target environment. Pre-written domain specific introspective rules can be run on the delta model and target model by the impact analyzer to prepare the change and impact analysis. That is, the impact analyzer such as impact analyzer 140 can access the source model (e.g., source model 132), the target model (e.g., target model 134) and the delta model (e.g., delta model 138). The impact analyzer 140 can comprise domain-specific code that determines the impact of the changes represented in the delta model. Now suppose, for example, the original system has Table 1 with Columns A, B and C. Suppose the change represented in the change set removes Column C from Table 1. The impact analyzer can compare the target model that has Column C with the delta model that does not have Column C and can determine that the data in Column C will be lost.

An update planner such as update planner 142 can access the source model 132, the target model 134 and the delta model 138 to generate an update plan such as update plan 144. The update plan can add additional changes to other subsystems affected by the original set of changes. For example, an update plan for adding Column C to Table 1 can be the imperative commands Alter Table 1, Add Column C to Table 1. Because the update plan is domain specific, the update plan can also include dropping the index and rebuilding it. The impact analyzer and the update planner can be separate or can be combined into a single program module or component. A report generator such as report generator 146 can receive the update plan 144, source model 132 and target model 134. The report generator can serialize the update plan and can convert the format of the update plan to a form that is able to be readily understood by humans. The language in which can the report is provided can be in a language localized for the user (e.g., in German for a German user, etc.)

The report generator 146 can include one or more program modules or components comprising a report analyzer. The report analyzer can be used to categorize the operation of domain-specific interests. Common interests include but are not limited to: potential long running operations, potential data loss operations, operations that touch sensitive objects and/or any other domain specific rules or patterns. The report generator can include one or more program modules or components comprising a custom formatter that can format reports 148 for human consumption.

Figure 1D:
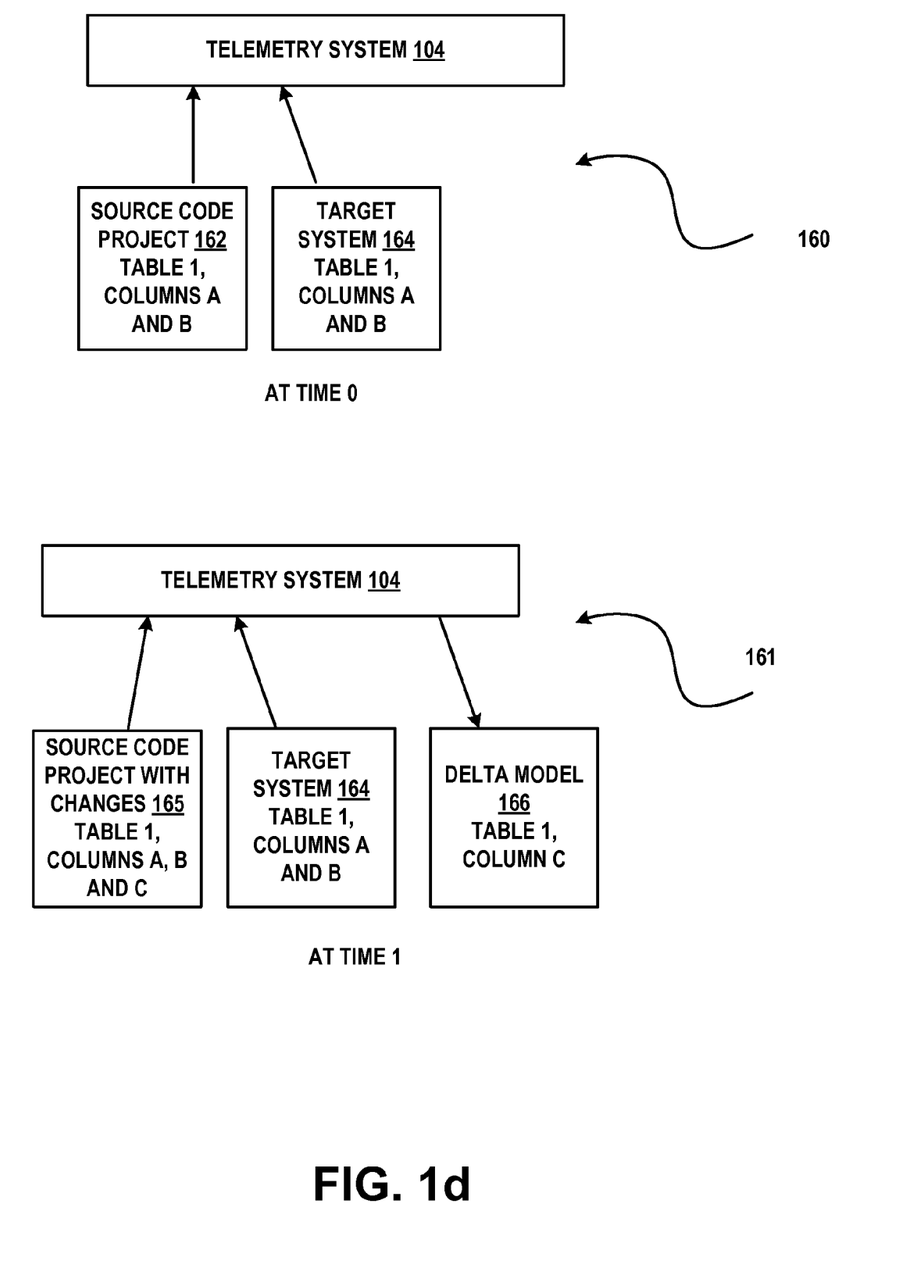
FIG. 1d illustrates an example of a usage pattern in accordance with aspects of the subject matter disclosed herein.

FIG. 1*d* illustrates an example illustrating change over time in accordance with aspects of the subject matter disclosed herein. FIG. 1*d* system 160 illustrates a source code project 162 and a target system 164 that are potential inputs to the telemetry system 104. Source code project 162 can be deployed at time 0 ($t_0$) to a target system 162. At this point the source code project 160 and the target system 162 represent the same system. For example, the source code project 162 and the target system 164 both define Table 1 having Columns A and B. Now suppose that changes are made to the source code project, but the changes have not been deployed to target system 164, represented in FIG. 1*d* by system 161. Suppose, for example, that Column C is added to Table 1 at time 1 ($t_1$). At $t_1$ a difference or delta exists between the source code project with changes 165 relative to source code project 162 and the target system 164. Target system 164 still defines Table 1 having Columns A and B. Source code project with changes 165 now defines Table 1 as having Columns A, B and C. The comparison between the system defined by source code project with changes 165 and the target system 164 results in the creation of the delta model 166. The source code project with changes defines Table 1 with Columns A, B and C. The target system 164 defines Table 1 as having Columns A and B and the delta model defines the delta as Table 1 Column C.

Figure 1E:
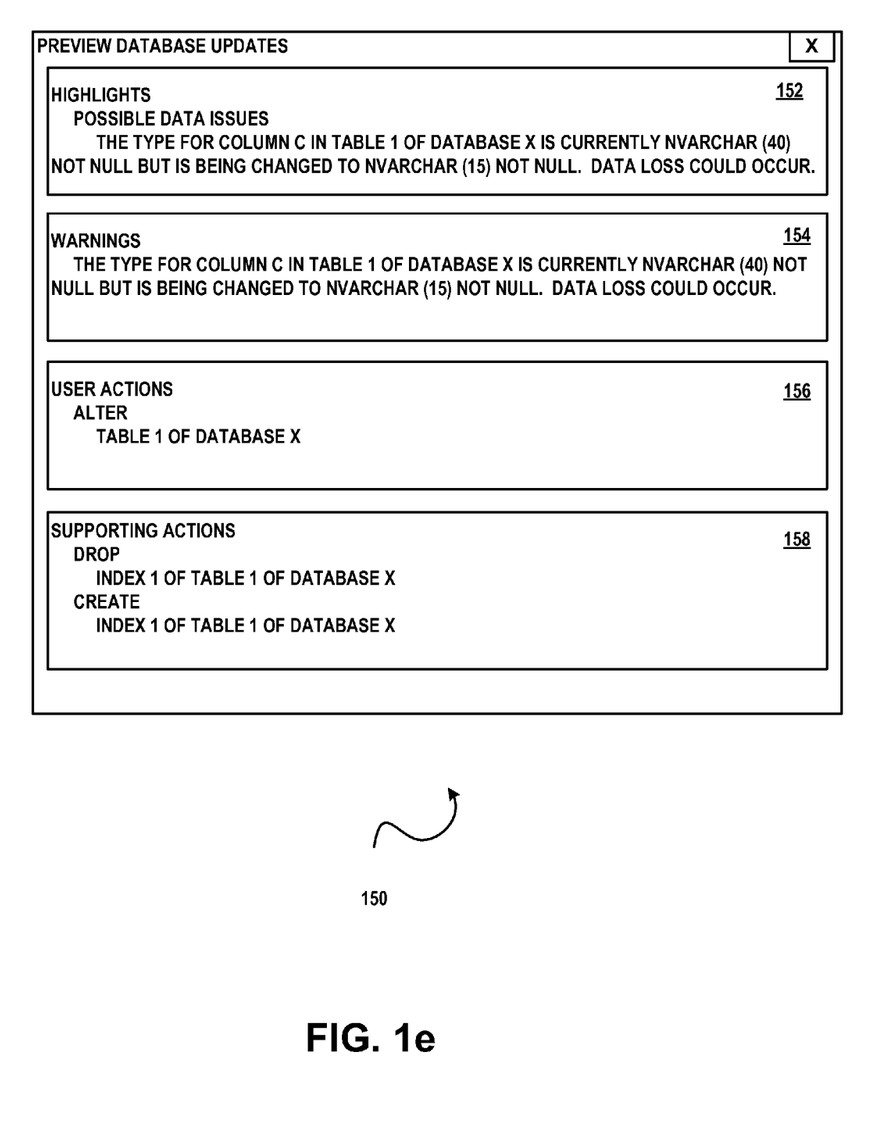
FIG. 1e illustrates an example of a report or display in accordance with aspects of the subject matter disclosed herein.

FIG. 1*e* illustrates an example of a report that can be generated by the report generator 146. A report such as report 150 can include a Highlights section such as Highlights section 152, a Warnings section such as Warnings section 154, a User actions section such as User actions section 156 and a Supporting actions sections such as Supporting actions section 158. Suppose the report 150 describes a set of changes that change the datatype of a Column, Column C in a database table, Table 1. The User actions section of the report can provide information associated with the set of changes that describes the user actions taken that change a system from a first state to a second state. For example, User actions section 156 of report 150 indicates that the Customers Table of Database X has been altered. The Highlights section of the report can provide information associated with the effects of the user-initiated changes. For example, Highlights section 152 can indicate the implications of the user action. Highlight section 152 indicates that the alteration made to the Customers Table changes the datatype for the Customer Name Column from 40 characters to 15 characters and that data loss could occur. (Customer names that are longer than 15 characters will be truncated to 15 characters.) The Warnings section of the report can provide information associated with the set of changes that describes potential undesirable effects of the changes. For example, Warnings section 154 warns that the alteration made to Customers Table changes the datatype for the Customer Name Column from 40 characters to 15 characters and that data loss could occur. The Supporting actions section identifies dependencies and additional changes that have to be made (e.g., to subsystems) as a consequence of making the user-initiated changes. For example, Supporting actions section 158 indicates that because the length of Customer Name has changed, the existing index that includes or points to Customer Name will have to be rebuilt. The existing Index will be discarded or dropped and a new Index will be created (the Index will be rebuilt) to reflect the 15 character Customer Names. The multi-staged solution described herein can increase the granularity of information that can be collected for analysis and reporting. Because discrete acts work on distinct input and output, a pluggable and extensible architecture is possible. Additional acts can be added. Existing actions can be improved without affecting other parts of the telemetry system.

Figure 2:
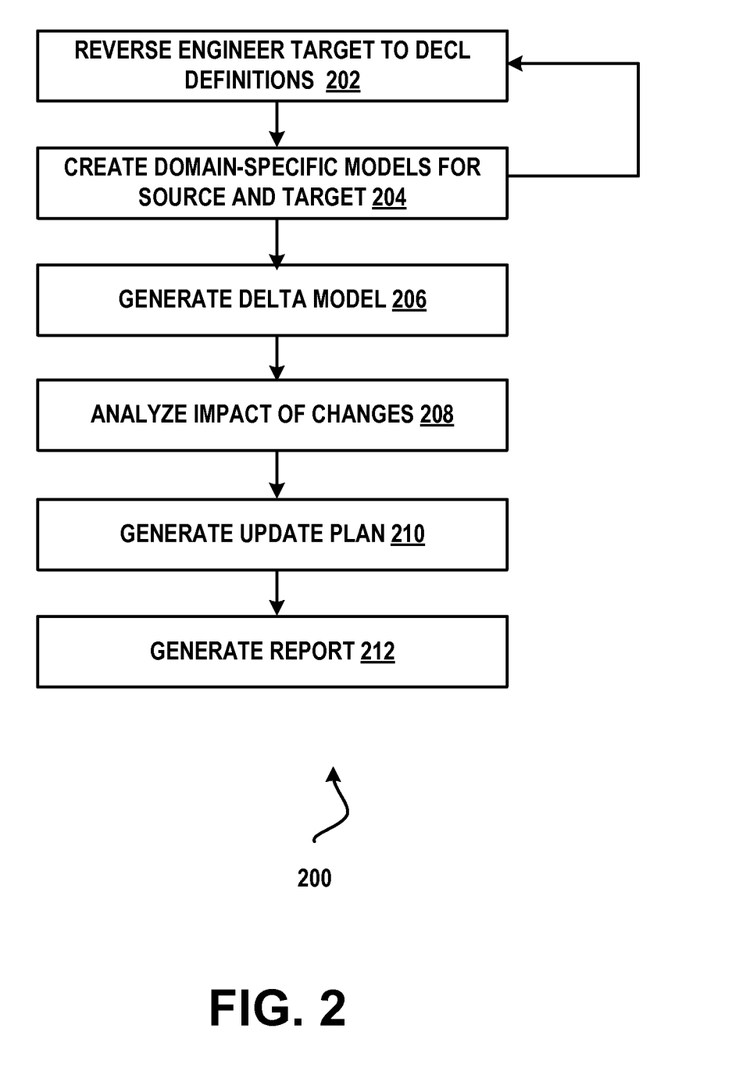
FIG. 2 illustrates an example of a method 200 that analyzes the impact of application of one or more sets of changes on a system and provides a natural language report or display to a user in accordance with aspects of the subject matter disclosed herein.

FIG. 2 illustrates a method 200 that analyzes the impact of the application of one or more sets of changes on a system and provides a report or display in natural language in accordance with aspects of the subject matter disclosed herein. The method described in FIG. 2 can be practiced by a system such as but not limited to the ones described with respect to FIGS. 1*a*, 1*b*, 1*c* and 1*d*. While method 200 describes a series of acts that are performed in a sequence, it is to be understood that method 200 is not limited by the order of the sequence. For instance, some acts may occur in a different order than that described. In addition, an act may occur concurrently with another act. In some instances, not all acts may be performed.

At 202 a target system or a reference to a target system is received by a telemetry system. The telemetry system can also receive one or more sets of changes that can be applied to the target system. The one or more change sets can be a set of declarative definitions. The one or more sets of changes can be in the form of imperative commands. If one or more of the changes are imperative commands, the imperative commands can be converted to declarative definitions as described above with respect to FIG. 1*b*. At 204 the declarative definitions of the sets of changes and the target system can be parsed in to domain specific declarative models to create a source model and a target model. The declarative models can include details of high order entities as well as the originating changes to which they are related. At 206 the source model and the target model can be compared and a delta model can be created. At 208 the impact of application of the sets of changes can be determined by running domain specific rules on the delta model. At 210 an update plan can be generated from the delta, source and target models to propagate the changes to subsystems of the system. At 212 one or more reports or displays, such as but not limited to a report or display such as report 150 of FIG. 1*e*, can be generated. The report or display can be presented in a form that can be readily understood by a human.

Example of a Suitable Computing Environment

Figure 3:
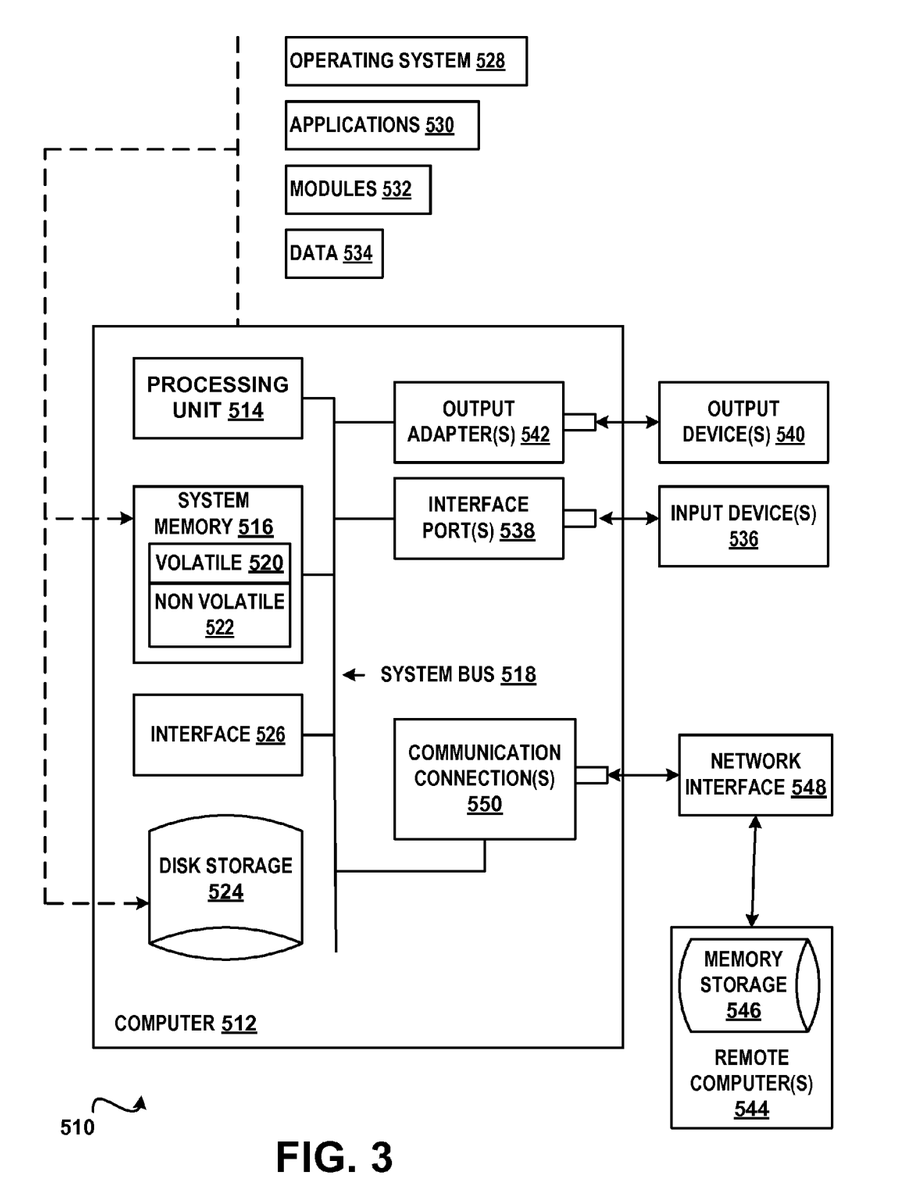
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a GPU. The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
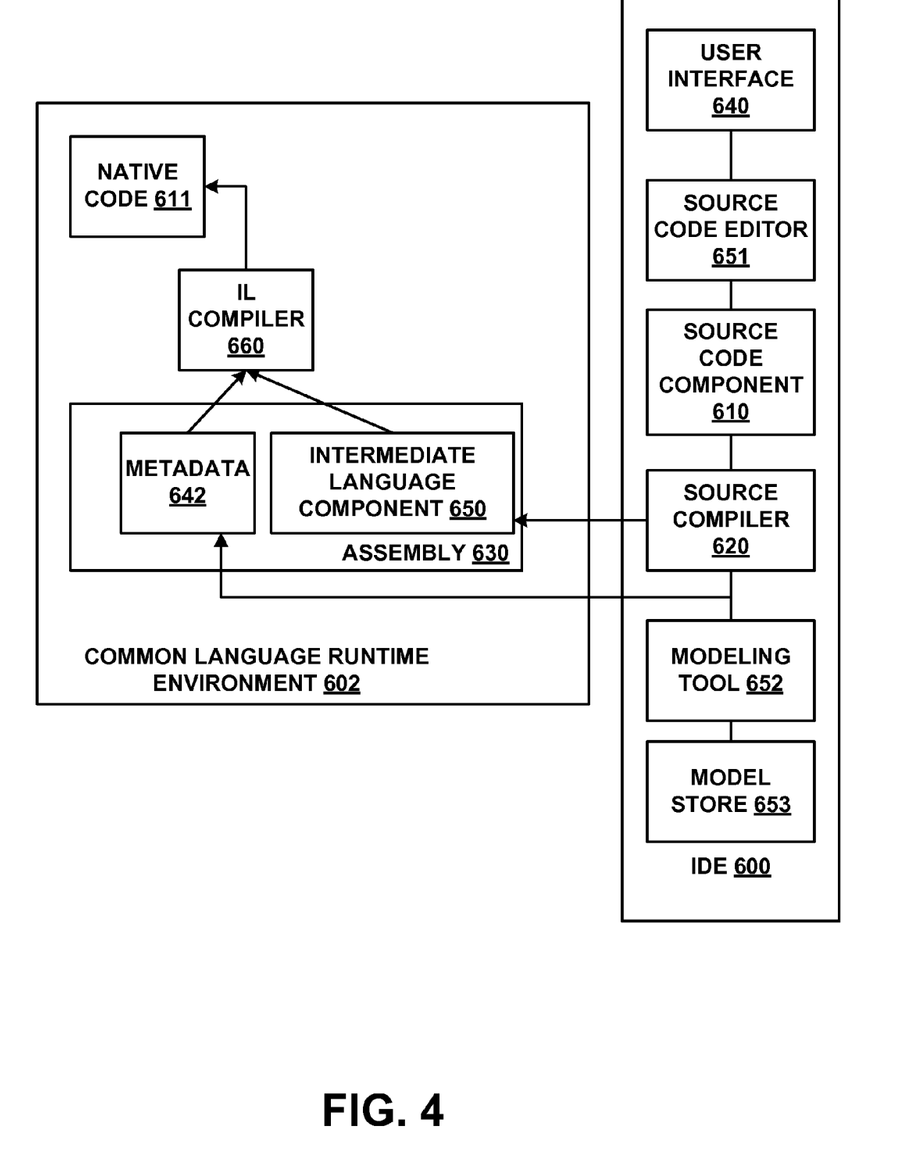
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform. The IDE 600 can further include a modeling tool 652 and/or a model store 653.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor of a computing device;
   a memory of the computing device; and
   at least one module loaded into the memory causing the at least one processor to:
   receive a system of interconnected subsystems;
   receive a set of system changes comprising imperative commands that are specific to a particular target environment and declarative definitions for the system of interconnected subsystems;
   convert the imperative commands to declarative definitions by:
   applying the set of changes to the system of interconnected subsystems to create an updated system, the set of changes comprising the imperative commands;
   comparing the system of interconnect subsystems and the updated system to compute a set of declarative definitions equivalent to the set of changes comprising the imperative commands;
   parse the set of declarative definitions equivalent to the set of changes in to domain specific declarative models to create a source model and a target model;
   compare the source model and the target model to create a delta model;
   determine an impact of application of the set of changes by running domain specific rules on the delta model; and
   transform the set of declarative definitions equivalent to the set of changes from a machine-consumable form to a natural language presentation, the natural language presentation providing information about user actions associated with the set of changes, the natural language presentation further comprising a warning section that provides information associated with the set of changes that describes potential undesirable effects of the changes.

2. The system of claim 1, wherein the natural language presentation further comprises consequences of applying the user actions to the system of interconnected subsystems.

3. The system of claim 1, wherein the natural language presentation further comprises potential adverse effects of applying the set of system changes.

4. The system of claim 1, wherein the natural language presentation further comprises additional changes needed as a consequence of applying the set of system changes to the system of interconnected subsystems.

5. The system of claim 4, further comprising at least one module loaded into the memory causing the at least one processor to:
   determine dependencies of the system of interconnected subsystems; and
   identify additional changes associated with the determined dependencies.

6. The system of claim 1, further comprising at least one module loaded into the memory causing the at least one processor to:
   customize the presentation for a specific domain associated with a particular user interface environment.

7. The system of claim 1, wherein a system domain comprises a database domain a database and the system comprises system.

8. A method comprising:
   receiving a set of system changes comprising imperative commands and declarative definitions for a system of interconnected subsystems;
   transforming a set of changes comprising imperative commands that are specific to a particular target environment to declarative definitions by:
   applying the set of changes to a source model to create a target model, the set of changes comprising the imperative commands, the source model comprising a representation of the target system prior to application of the set of changes;

comparing the source model and the target model to compute a set of declarative definitions equivalent to the set of changes comprising the imperative commands;

parsing the set of declarative definitions equivalent to the set of changes in to domain specific declarative models to create a source model and a target model;

comparing the source model and the target model to create a delta model;

determining an impact of application of the set of changes by running domain specific rules on the delta model; and transforming the set of declarative definitions equivalent to the set of changes from a machine-consumable form to a natural language presentation by a processor of a computing device, the natural language presentation providing information about user actions associated with the set of changes.

9. The method of claim 8, further comprising:
providing consequences of applying the user actions to the system in the natural language presentation; and providing potential adverse effects of applying the set of system changes in the natural language presentation.

10. The method of claim 8, further comprising:
displaying in the natural language presentation, additional changes needed as a consequence of applying the set of system changes to the system.

11. The method of claim 8, further comprising:
customizing the natural language presentation for a specific user profile.

12. The method of claim 8, further comprising:
determining dependencies of the system; and
identifying additional changes associated with the determined dependencies.

13. The method of claim 8, further comprising:
receiving a set of changes comprising imperative commands or declarative definitions for a database system; and
identifying additional changes associated with the determined dependencies.

14. A computer-readable storage medium comprising computer-executable instructions which when executed cause at least one processor of a computing device to:
receive a set of changes comprising imperative commands for a database system, the imperative commands are specific to a particular target environment;
converting the imperative commands to declarative definitions by:
applying the set of changes to the database system to create an updated system, the set of changes comprising the imperative commands;
comparing the database system and the updated system to compute a set of declarative definitions equivalent to the set of changes comprising the imperative commands;
parsing the set of declarative definitions equivalent to the set of changes in to domain specific declarative models to create a source model and a target model;
comparing the source model and the target model to create a delta model;
determining an impact of application of the set of changes by running domain specific rules on the delta model; and
transform the set of declarative definitions equivalent to the set of changes into a natural language presentation, the presentation identifying user actions associated with the set of changes and identifying effects of the user actions on the database system.

15. The computer-readable storage medium of claim 14, comprising further computer-executable instructions which when executed cause the at least one processor of the computing device to:
display in the natural language presentation, additional changes needed as a consequence of applying the set of system changes to the system.

16. The computer-readable storage medium of claim 14, comprising further computer-executable instructions which when executed cause the at least one processor of the computing device to:
display in the natural language presentation, potential adverse effects of applying the set of system changes.

17. The computer-readable storage medium of claim 14, comprising further computer-executable instructions which when executed cause the at least one processor of the computing device to:
display in the natural language presentation, dependencies of applying the set of system changes and additional changes associated with the determined dependencies.

18. The computer-readable storage medium of claim 14, comprising further computer-executable instructions which when executed cause the at least one processor of the computing device to:
customize the natural language presentation for a specific domain.

19. The computer-readable storage medium of claim 14, comprising further computer-executable instructions which when executed cause the at least one processor of the computing device to:
customize the natural language presentation for a particular user interface environment or for a particular user profile.

* * * * *